July 13, 1926.
L. J. BERRY
1,592,651
MOTOR CYCLE SEAT
Filed August 24, 1925
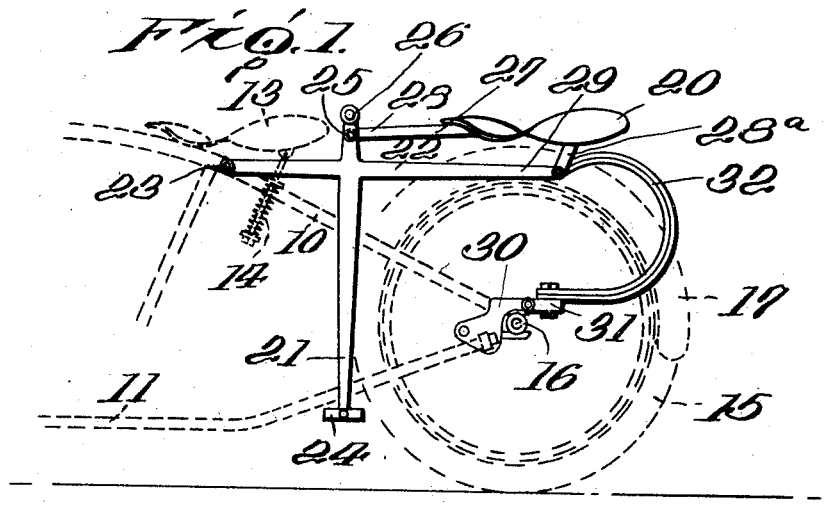
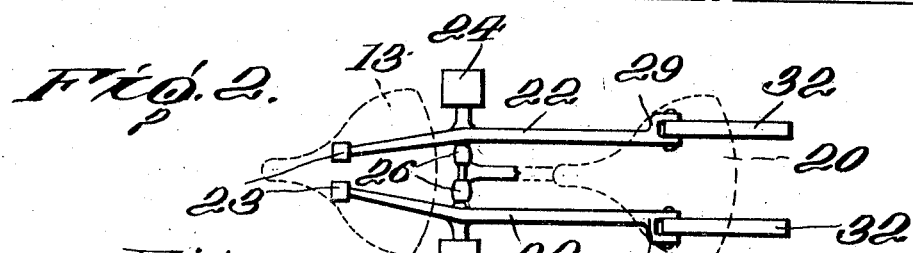
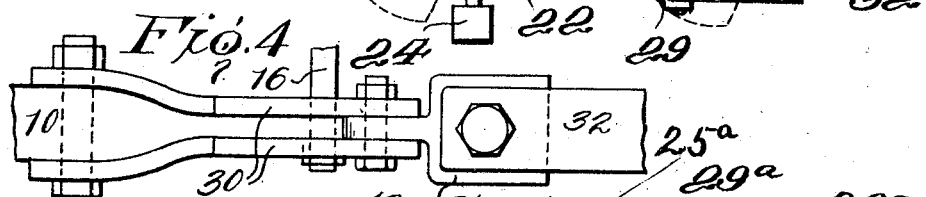
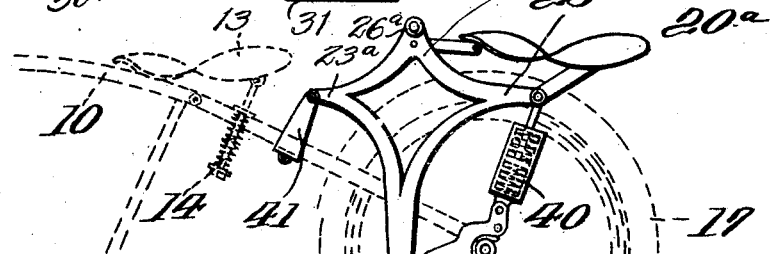
Inventor
Louis J. Berry
By Sturtevant & Mason
Attorneys.

Patented July 13, 1926.

1,592,651

UNITED STATES PATENT OFFICE.

LOUIS JEROME BERRY, OF WORCESTER, MASSACHUSETTS.

MOTOR-CYCLE SEAT.

Application filed August 24, 1925. Serial No. 52,018.

The present invention relates to improvements in auxiliary seats and seat suspensions for accommodating a passenger upon a motorcycle.

It has been heretofore proposed to provide a seat mounted above the rear wheel and behind the driver's seat for the accommodation of a passenger; but in all of the devices of such types heretofore constructed, the method of mounting the necessary parts has not provided a comfortable seat for the rider, nor a simple assembly of the parts themselves.

According to the present invention, the saddle is carried by a spring-supported subframe which has the saddle, pedals and hand bar fastened thereto; so that no forced relative movement of the rider's body occurs.

In the drawing:

Fig. 1 is an elevation of the device as attached to the rear of a motorcycle.

Fig. 2 is a plan view of the same.

Fig. 3 is an elevation of a modified form.

Fig. 4 is a detail plan view on an enlarged scale, showing the assembly of the pad 30 at one of the rear forks.

In these figures, the rear end of a motorcycle has been conventionally represented as having the upper frame member 10, the lower frame member 11, and the saddle 13 carried by the springs 14 mounted for movement relatively to the upper frame 10. The two frame members 10 and 11 are each bifurcated and diverge to either side of the rear wheel 15, and at their joined ends have a fork to receive the axle 16 of the rear wheel. The customary mudguard 17 is shown as surrounding the upper portion of the wheel.

According to this invention, the saddle 20 of the auxiliary seat is carried on the subframe composed of the two X-shaped members 22, which at their forward ends 23 are pivoted to the upper frame member 10 adjacent the support for the saddle 13. The downward ends 21 of this subframe support the pedals 24; and the extreme upward ends 25 the handle bar 26. The saddle 20 is carried on a bar 27 which is rigidly connected to the upward ends 25 of the subframe at the forward end 28 of the bar 27, and to the rearward ends 29 of the subframe members 22 at the rearward and downward ends 28ª of the bar 27.

A pad 30 is fastened to the main frame at each side thereof immediately forward of the axle 16, and carries pivoted thereto a bracket 31. A supporting spring 32, preferably composed of two parallel portions, is fastened rigidly to each of these brackets, which extends rearward, then upward, and finally forward in a substantially semi-circular arc, and at its upper end is pivoted to the rearward end 29 of one of the X-shaped members 22.

In operation, the rider seated upon the saddle 20 places his feet upon the pedals 24, and grasps the handbar 26. In this position he is carried safely, and there is no relative movement between the various parts of his body, as the saddle rises and falls relatively to the main frame of the motorcycle. The springs 32 take up the shocks and afford a comfortable seat. The simple and rigid X-shaped subframe is easily attached and removed, and is supported at strengthened points of the main frame, so that no bending moments occur.

In the modified form shown in Fig. 3, a plunger type of coil spring 40 is substituted for the form of Fig. 1. The basic principle is the same, and the subframe is pivoted at the forward ends 23ª to pads 41 on the main frame; the sub-frame carries handbars 26ª at its upper end 25ª and pedals 24ª at its lower ends 21ª and is carried by a spring suspension 40 at the rearward end 29ª; while the saddle 20ª is carried between the upward and rearward ends.

It is obvious that further changes may be made in the device within the scope of the appended claims.

Having thus described my invention, what I claim is:

1. An auxiliary seat mounting for a motorcycle having a subframe of interconnected X-shaped members, the forward ends of said members being pivoted to the main frame of the motorcycle, pedals attached to the lower ends of said members, a handbar attached at the upper end of said members, a saddle carried between the upper and rearward ends of said members, and a spring suspension between the rearward end of said members and the rear end of the main frame of the motorcycle.

2. In an auxiliary seat for a motorcycle, a rigid subframe pivoted at its front end to the main frame of the motorcycle, a spring suspension between the rear end of said subframe and the rear end of the motorcycle, pedals and a handbar rigidly carried by said subframe, and a saddle supported by said subframe.

3. In an auxiliary seat for a motorcycle, a rigid subframe pivoted at its forward end to the main frame of the motorcycle adjacent the saddle support thereof, rigid extensions on said subframe, pedals and a handbar mounted on said extensions, a saddle mounted on said subframe, pads attached to the rear end of the main frame of the motorcycle, and semi-circular springs pivotally connected to said pads and the rearward end of said subframe.

4. In a mounting for an auxiliary seat on a motorcycle, having a saddle, pedals and a handbar, the combination of a rigid integral X-shaped member on each side of the rear wheel of the motorcycle and pivoted at its forward end to the main frame of the same, said saddle, pedals and handbar being rigidly connected to said members, and a spring connected between the rear end of the motorcycle frame and the rear end of each of the said members.

5. In an auxiliary seat for a motorcycle, a rigid subframe pivoted at its forward end to the main frame of the motorcycle, a resilient suspension between said subframe and the frame of the motorcycle, pedals and a handbar carried rigidly by said subframe, and a saddle supported on said subframe.

6. In an auxiliary seat for a motorcycle, a rigid subframe pivoted to the main frame of the motorcycle, pedals and a handbar carried rigidly by said subframe, a saddle supported on said subframe, and cushioning and resilient means interposed between said subframe and said main frame.

7. In an auxiliary seat for a motorcycle, a subframe, a handbar, pedals and a saddle rigidly attached to said subframe, a pivot connection between the forward end of said subframe and the main frame of the motorcycle, and a spring suspension between the said subframe and the said main frame.

In testimony whereof, I affix my signature.

LOUIS JEROME BERRY.